US009491899B1

(12) United States Patent
Fulghum et al.

(10) Patent No.: US 9,491,899 B1
(45) Date of Patent: Nov. 15, 2016

(54) PROCESSOR FOR RHIZOMES AND THE LIKE

(71) Applicant: Repreve Renewables LLC, Greensboro, NC (US)

(72) Inventors: Michael Edward Fulghum, Tarrytown, GA (US); Thomas Logan Fazio, Jupiter, FL (US)

(73) Assignee: Repreve Renewables, Inc., Greensboro, NC (US)

( * ) Notice: Subject to any disclaimer, the term of this patent is extended or adjusted under 35 U.S.C. 154(b) by 90 days.

(21) Appl. No.: 14/170,578

(22) Filed: Feb. 1, 2014

(51) Int. Cl.
*A01C 1/00* (2006.01)
*B02C 23/08* (2006.01)
*B02C 23/20* (2006.01)
*B07B 1/28* (2006.01)

(52) U.S. Cl.
CPC .............. *A01C 1/00* (2013.01); *B02C 23/08* (2013.01); *B02C 23/20* (2013.01); *B07B 1/28* (2013.01)

(58) Field of Classification Search
CPC ......... A01C 1/00; B02C 23/08; B02C 23/00; B02C 23/20; B02C 23/18; B07B 1/28; B07B 1/00
See application file for complete search history.

(56) References Cited

U.S. PATENT DOCUMENTS

| 1,803,131 A | 4/1931 | Pierson ........................... 460/89 |
| 3,026,001 A | 3/1962 | Landgraf |
| 3,078,926 A | 2/1963 | Ries ................................. 171/14 |
| 3,365,869 A | 1/1968 | Whiteley ..................... 56/327.1 |
| 3,420,239 A | 1/1969 | Lorenzen ...................... 460/147 |
| 3,999,613 A | 12/1976 | Porter ............................. 171/14 |
| 4,008,826 A | 2/1977 | Carree ............................. 221/13 |
| 4,251,895 A * | 2/1981 | Caridis .............. A47J 37/1214 15/3.13 |
| 4,965,993 A | 10/1990 | Butler et al. ................. 56/327.1 |
| 5,417,293 A | 5/1995 | Leader .......................... 172/721 |
| 6,722,297 B1 | 4/2004 | Nelson, Jr. .................... 111/104 |
| PP23,489 P3 | 3/2013 | Baldwin |

FOREIGN PATENT DOCUMENTS

| FR | 2960121 | 11/2011 | .............. A01C 9/00 |
| JP | 07107829 | 4/1995 | ............. A01D 17/00 |

OTHER PUBLICATIONS

"Enhanced Vegetative Cultivation of Miscanthus Rhizomes," Gavin Maxwell Coolfin Partnership, UIUC Bioenergy Symposium 2012.
Miscanthus Planter Machinery, Manufacturers and Suppliers, W.H. Loxton, Ltd., retrieved from the internet .May 2013.
"Planting and Managing Freedom Giant Miscanthus for Biofuel Using the Biomass Crop Assistance Program," USDA, NRCS, Jul. 2011.

(Continued)

Primary Examiner — Christopher J Novosad
(74) Attorney, Agent, or Firm — MacCord Mason PLLC

(57) ABSTRACT

A method and apparatus for processing harvested *miscanthus* or other rhizomes to condition them for replanting to grow new *miscanthus* plants are disclosed. Bulk quantities of clusters of rhizomes are supplied to a first inclined ramp conveyor, the clusters of rhizomes are caught on a mechanism that pushes the clusters of rhizomes to a location where the clusters of rhizomes encounter obstructers that cooperate with the mechanism to cut and reduce the size of the clusters. The reduced size clusters are vibrated to loosen and separate soil from the reduced size cluster of rhizomes, washed to wash dirt from the clusters, and collected for supply to a planter.

9 Claims, 7 Drawing Sheets

(56) References Cited

OTHER PUBLICATIONS

"Planting and Growing Miscanthus," Best Practice Guidelines, Jul. 2007.
"Series GL cup planting machines," Grimme Harvesting Success, Potato Technology; undated, admitted prior art.
"Planting and Managing Giant Miscanthus as a Biomass Energy Crop, "Technical Note No. 4, USDA, NRCS Jul. 2011.

"Demonstration of Giant Miscanthus Equipment," [on line] https://222.youtube.com/watch?v-VAQwG_PWnt0&feature=youtu.be, Mar. 10, 2011 [retrieved Nov. 18, 2015].
Rhizome, Root, Sprig Harvester, [on line] http://spriggerschoice.com/index_files/RHIZOMEROOTSPRIGHARVESTER.htm [retrieved Nov. 18, 2015].

* cited by examiner

PROCESSOR FOR RHIZOMES AND THE LIKE

BACKGROUND OF THE INVENTION

Developments in the plant propagation and perennial crop production industry have generated the need for an efficient planting system. One arena of vegetative propagation includes planting live processed rhizomes, tubers, nodal stem cuttings, or cane pieces. The present invention has been developed for these types of plant propagules, such as Rhizomes of *Miscanthus* or *Arundo*; Cane pieces such as sugar cane, Miscanes, Napiergrass, Energy Cane and crops such as Potatoes and Horseradish. Giant *Miscanthus* (*Miscanthus giganteus*) (Mxg) will be discussed herein to exemplify the use of the invention, but the machine and its use are not limited to Giant *Miscanthus*, and references to rhizomes herein should be interpreted to include such tubers, nodal stem cuttings or cane pieces. Much background information on the cultivation of *Miscanthus* can be obtained from "Planting and Managing Giant *Miscanthus* as a Biomass Energy Crop," U.S. Dept. of Agriculture, Natural Resources Conservation Service, Plant Materials Program, Technical Note No. 4, July 2011, the entire disclosure of which is incorporated herein by reference (hereinafter referred to as "NRCS publication.)

Mxg used in this crop demonstration is a sterile hybrid, warm-season perennial grass that is native to Asia. The variety is commercially known as 'Freedom' (See U.S. Plant Patent Publication PP 23,489, the entire disclosure of which is incorporated herein by reference). It can produce large amounts of biomass, across several temperate latitudes, due to its high range of adaptability in both warm and cool climates, and in various soil types.

Sterile Mxg propagates and grows from rhizomes, and is becoming widely accepted for various agriculture and biorenewable products. Underground rhizomes can range from a few (20-40) to several hundred per plant depending on age, growing environment, and genetics of the individual genotype or clone. These parameters are the focus of efforts in regards to growing, digging rhizomes for seeding new fields, processing of rhizomes, and planting the crop.

Solid and efficient establishment of any vegetative propagated crop is to for the crop's success. Challenges in the establishment of rhizome planted crops like Mxg include weed competition, and provision of healthy viable rhizomes, planting date, and moisture availability. It is most important that stand density and subsequent plant populations are adequate for optimizing yield. Dense stands require little or no weed control after the establishment year.

Description of Plant Material

In general, if not directly transplanted from rhizome harvest, rhizomes can be stored and not lose viability for a period of time, depending on storage conditions. Proper temperature and moisture levels during storage are may be critical to maintaining viability. Fields typically can be planted between February and June, depending upon latitude, soil temperature and soil moisture level, while being mindful that frost damage can occur. Rhizomes should be planted between 3 and 4 inches deep in moist soil. Planting rates can vary, depending upon many factors. The desired final population is between 6000-10,800 plants per acre, with the quantity depending on soil quality and water availability. This usually requires planting a minimum of 6,000 rhizomes per acre. Recommended spacing varies between 36-inch rows by 36-inch spacing; 30-inch rows with 30-inch spacing; 30-inch rows by 24-inch spacing; or 24-inch rows by 24-inch spacing, depending on plant population density required for an optimal stand. Modified corn planters, potato planters, carousel planters and vegetable planters have been recommended to be used to plant rhizomes. These recommendations are not of the device described herein. After planting rhizomes, the field should be rolled to ensure good soil contact with the rhizomes.

Giant *miscanthus* can be harvested with a silage harvester, or mowed and baled. Regardless of the harvest method used, a 2-4 inch stubble height is recommended to maximize yield, but avoid picking up the leaf litter.

Rhizome quality—Age of mother plants affects rhizome quality and rhizome quality affects stand establishment. In one European study cited in the NRCS publication, survival was 88 percent with rhizome pieces from 5-year-old plants compared to only 25 percent for rhizomes from 1-year-old plants and 52 percent for rhizomes from 9-year-old plants. Preliminary work in Mississippi has shown better rhizome quality from 2-year-old plants than from 4-year-old plants. These studies indicate that quality of rhizome increases with mother plant age, but only up to a certain point.

For field planting, according to the NRCS publication, a plantable quantity of rhizomes should weigh about 1.5 to 2 ounces (50 g) and the rhizomes should be about 4 to 5 inches long, but can be smaller depending on variety and species type where smaller or larger rhizomes maintain acceptable viability. Rhizome quantity per drop is adjusted to ensure good establishment while reducing the risk of amount to excess surplus and waste. For Mxg, good quality rhizomes pieces can be branched or unbranched pieces, and should appear scaly and buff colored. Typically they will have small feeder roots attached. Those feeder roots can entangle with the roots of adjacent rhizomes in a bulk container.

Rhizome yield—Age of mother plant also affects rhizome yield according to the NRCS publication. Hand dug, 1-year-old plants were found to produce 7 to 10 harvestable rhizomes, 2-year-old plants produced 25 to 30 harvestable rhizomes, and 3-year-old plants produced 75 to 80 harvestable rhizomes (Pyter et al. 2009). Yield of mechanically dug rhizomes is not as high. The European rule of thumb is that for each acre of 4-year-old *miscanthus* mother field, one can expect enough rhizomes to plant 8 to 10 acres.

Digging considerations—Rhizomes can be dug anytime in the fall or winter period after the plants have senesced and biomass removed. However, the most common time for harvesting for field planting is in the spring prior to shoot emergence. Rhizomes should be used as soon as possible after digging, but they can be stored temporarily if kept cool and moist. This can be accomplished by covering the rhizome heap with moist soil, but it is critical that the rhizomes not be allowed to dry out or go through a heat. Additionally, care should be taken to not let rhizomes dry out during transport.

Depending on planting method used, the rhizomes also may need to be cleaned and sized. Sizing is particularly critical to ensure rhizomes pieces will feed through the transplanter openings. Follow planter manufacturer's directions or do test runs to determine what size rhizome pieces are best used for the variety, and or species to be planted.

Planting depth—Regardless of the type of planting equipment used, giant *miscanthus* rhizomes should be planted between 2 and 4 inches deep.

Planting rate—Plant populations between 4,000 and 16,000 plants per acre have been evaluated. Higher numbers provide earlier canopy closure and weed control, but are more expensive to establish with relatively little improvements in long-term yield. However, year 1 and 2 establishment yields have shown improvement with the higher stand densities and require less overall weed control. The consensus among researchers is that the desired final population should be between 4,000 and 5,000 plants per acre. Since large rhizome (1.5-2 oz) survival usually averages 60 to 70 percent, this means 6,000 to 7,000 rhizomes per acre are needed to get the final recommended stand. The higher rate should be used for less optimum conditions (e.g., soils with lower water holding capacity, higher expected weed competition, late planting, etc.). With irrigation, establishment survival should be higher, and lower rates may be practical. However, the quality of the rhizome is important in any condition.

Row spacing—According to one recommendation, in the Midwest plant using 30-inch rows with 30-inch spacing between plants. This is based on two factors. One is the need to use up to 7,000 rhizomes per acre to get the desired final stand density, and the second is that research has shown that actually leaving equal space around each rhizome or plug gives better first season growth. Given variability in the planting equipment available, slight variations in the 30- by 30-inch spacing would be reasonable as long as plant population is maintained.

Planting methods—Most research stands of giant *miscanthus* have been established by hand planting rhizomes as space plants or by dropping rhizomes into furrows that were subsequently covered up. Broadcast planting followed by disking in and packing was the earliest mechanical method of planting rhizome pieces, but issues with consistent planting depth and the need for tillage to control weeds prompted the modification and use of standard row planting equipment.

Modified corn drills and potato planters have been used to plant rhizomes, and vegetable or tobacco planters have been used for transplants or plugs. European and American equipment manufacturers have actively been modifying and/or developing planting equipment to plant both rhizome pieces and transplants.

Table 1 lists some of the manufactures advertising specialized giant *miscanthus* planting equipment for the United States or Canadian market in 2011. In the case of rhizomes, the field should be rolled after planting to ensure good soil contact and few air spaces unless otherwise directed by the planter manufacturer. Irrigation is recommended after planting if transplants or plugs are used, and additional applications may be warranted the first growing season. If available, irrigation also may be warranted to speed the establishment and, thus, first-year survival of rhizome-planted field

TABLE 1

Dedicated giant miscanthus digging and planting equipment available for United States/Canadian market in 2011

| Available from | Web address |
|---|---|
| WHL | miscanthusplanter.com |
| Spriggers Choice | spriggerschoice.com/index_files/ miscanthuspropergationmachinery.htm |
| Cool Fin Partnership | bioenergyfeedstocks.igb.uiuc.edu/2010/ppt/maxwell.pdf |

Despite these advances in the art of *miscanthus* cultivation, there remains a need for improved machinery and processes for retrieving rhizomes from mature plants, processing them to produce suitable planting stock, and re-planting the rhizome planting stock in fields.

Table 2 indicates various density adjustments per acre associated with conventional row and plant spacing.

TABLE 2

Effect of planting arrangement on the number of rhizomes or plugs per acre

| Row spacing Inches | Within row spacing | No. rhizomes or plugs/acre |
|---|---|---|
| 30 | 24 | 8,700 |
| 30 | 30 | 7,000 |
| 36 | 24 | 7,000 |
| 36 | 30 | 6,000 |
| 36 | 36 | 5,000 |

Despite these advances in the art of *miscanthus* cultivation, there remains a need for improved machinery and processes for processing rhizomes and the like that have been retrieved from fields in which they have grown to make them suitable for re-planting. A preferred planter is disclosed in our co-pending application entitled "Planter for Rhizomes and the like", Ser. No. 14/170,572, filed on Feb. 1, 2014. A preferred digger is disclosed in our co-pending application entitled "Digger for Rhizomes and the like", Ser. No. 14/170,573, filed on Feb. 1, 2014. The disclosures of those two applications are incorporated herein by reference. The present invention is advantageously used in combination with those two inventions, but they are not required.

SUMMARY OF THE INVENTION

The present invention fulfills one or more of these needs in the art by providing an apparatus for processing harvested rhizomes to condition them for replanting to grow new plants. A hopper receives bulk quantities of clusters of *miscanthus* or other rhizomes, and a first inclined ramp conveyor positioned to receive clusters from the hopper has a live bottom mounted to move clusters of rhizomes up the ramp. Upright posts that move with the live bottom catch and push the clusters of rhizomes up the inclined ramp. Superstructure bars over the ramp extend above the live bottom and have obstructers extending downward from the superstructure bars toward the live bottom. The upright posts on the live bottom catch and push clusters of rhizomes and soil up the inclined ramp, and as clusters encounter the obstructers, the cluster is cut and/or broken to reduce its size and to loosen and separate soil from the rhizomes. A second inclined ramp conveyor is positioned to receive reduced-size clusters from the first inclined ramp conveyor and has a vibrator to impart vibration to the reduced-size clusters to shake dirt and debris from the reduced-size clusters. A washer conveyor downstream of the second inclined ramp conveyor receives reduced-size clusters and has a liquid supply apparatus to apply liquid to the reduced-size clusters to wash dirt from the clusters. A collector receives washed, reduced-size clusters to supply them to a planter.

Preferably, a soil collector conveyor positioned under at least the second inclined ramp conveyor collects dirt shaken from the reduced-size clusters. The soil collector conveyor may also be positioned under the first inclined ramp conveyor, and include a lateral conveyor to transport collected dirt in a direction transverse to the soil collector conveyor, to allow the soil to be returned to a field.

A second inclined ramp conveyor may be positioned to receive reduced-size clusters from the second inclined ramp conveyor and have a live bottom mounted to move clusters of rhizomes up the second inclined ramp conveyor, including upright posts that move with the live bottom to catch and push the clusters of rhizomes up the second inclined ramp conveyor. The second inclined ramp conveyor is also provided with superstructure bars extending above the live bottom and having obstructers extending downward from the superstructure bars toward the live bottom. The upright posts on the live bottom catch and push reduced-size clusters of rhizomes up the inclined ramp, and as reduced-size clusters encounter the obstructers, the reduced-size cluster is cut or broken further to reduce its size and to loosen and separate soil from the rhizomes.

The apparatus can include an outfeed ramp positioned to receive washed, reduced-size clusters from the washer conveyor to allow liquid to drain from the washed, reduced-size clusters.

In one embodiment, there are two first inclined ramp conveyors, two second inclined ramp conveyors, two washer conveyors, with the two first inclined ramp conveyors supplied with clusters from a common hopper. At least some of the conveyors are preferably vibrating screens. Two narrowing inclined ramp conveyors are also included that each has a sidewall above the conveyor that forms an acute angle with the conveyor, so that clusters traveling on the conveyor are guided by the sidewall toward a central portion of the narrowing conveyor and each narrowing inclined ramp conveyor discharges clusters to one of the first inclined ramp conveyors. A divider in the form of two opposed slopes with a common peak is positioned between the common hopper and the two narrowing inclined ramps, so that as clusters fall from the common hopper onto the divider, some of the clusters impact one of the two opposed slopes to fall onto one of the narrowing inclined ramps and others of the clusters fall on the other of the two opposed slopes to fall onto the other narrowing inclined ramp.

The conveyors can be driven by various motive sources such as electric motors and hydraulic motors.

The invention can also be considered as a method of processing harvested rhizomes to condition them for replanting to grow new *miscanthus* plants. The method includes supplying bulk quantities of clusters of rhizomes to a first conveyor, catching the clusters of rhizomes on a mechanism that pushes the clusters of rhizomes to a location where the clusters of rhizomes encounter obstructers that cooperate with the mechanism to cut and reduce the size of the clusters, vibrating the reduced size clusters to loosen and separate soil from the reduced size cluster of rhizomes, washing the reduced-size clusters to wash dirt from the clusters, and collecting the washed, reduced-size clusters to supply them to a planter.

Preferably, the method includes collecting soil falling from the clusters of rhizomes and transporting the collected soil laterally away from the reduced size clusters.

The method may include catching the reduced-size clusters on a second mechanism that pushes the clusters of rhizomes to a location where the clusters of rhizomes encounter obstructers that cooperate with the mechanism to further cut and reduce the size of the reduced-size clusters. Preferably, the method includes draining liquid from the washed, reduced-size clusters.

Supplying bulk quantities of clusters of rhizomes may include supplying the clusters from a single bulk quantity supply to two conveyors to divide the single bulk quantity into two smaller quantities. The two smaller quantities may be created by depositing the single bulk quantity on a divider so that portions of the single bulk quantity fall to one side to form one of the smaller quantities and portions fall to the other side to form the other smaller quantity.

The method may also be considered as processing harvested clusters of rhizomes to condition them for replanting to grow new *miscanthus* plants, including pushing the clusters of rhizomes with a mechanism to a location where the clusters of rhizomes encounter obstructers that cooperate with the mechanism to cut and reduce the size of the clusters, and using the mechanism to continually push reduced-size clusters to obstructers to reduce the size of the clusters until the majority of the clusters are single rhizomes that are 3 to 6, or more preferably, 4 to 5 inches long.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
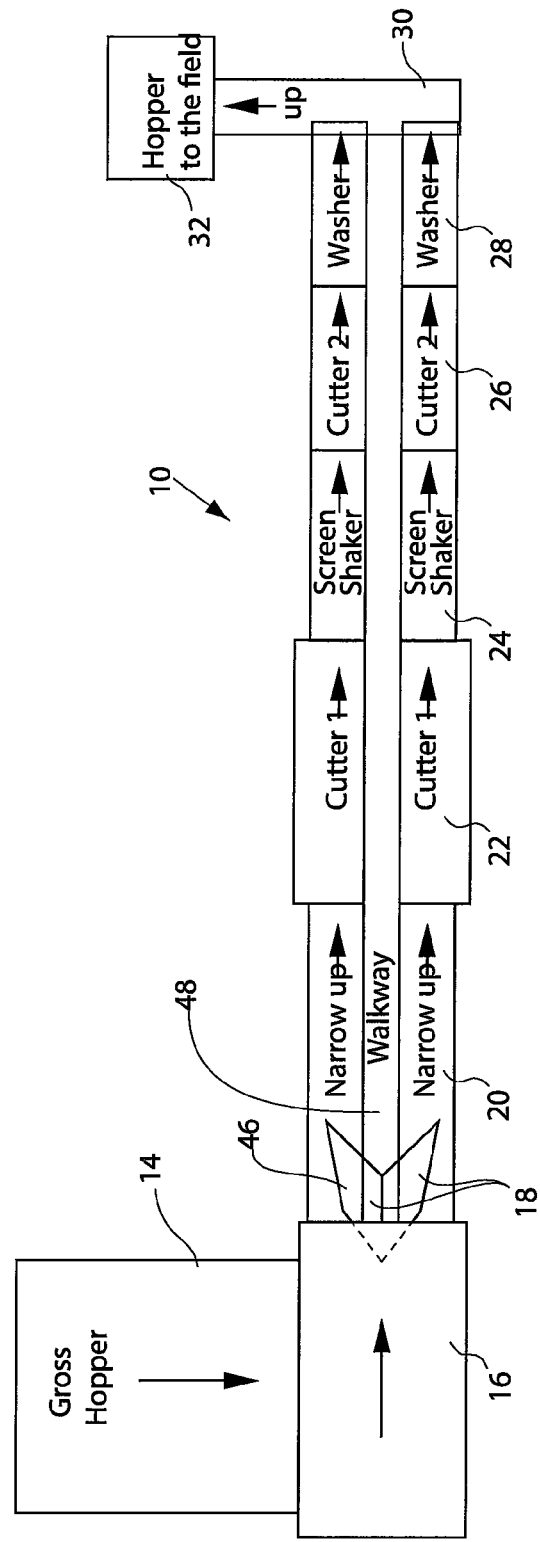
FIG. 1 is a schematic plan view of the conveyor arrangement for rhizomes according to an embodiment of the invention.
Figure 2:
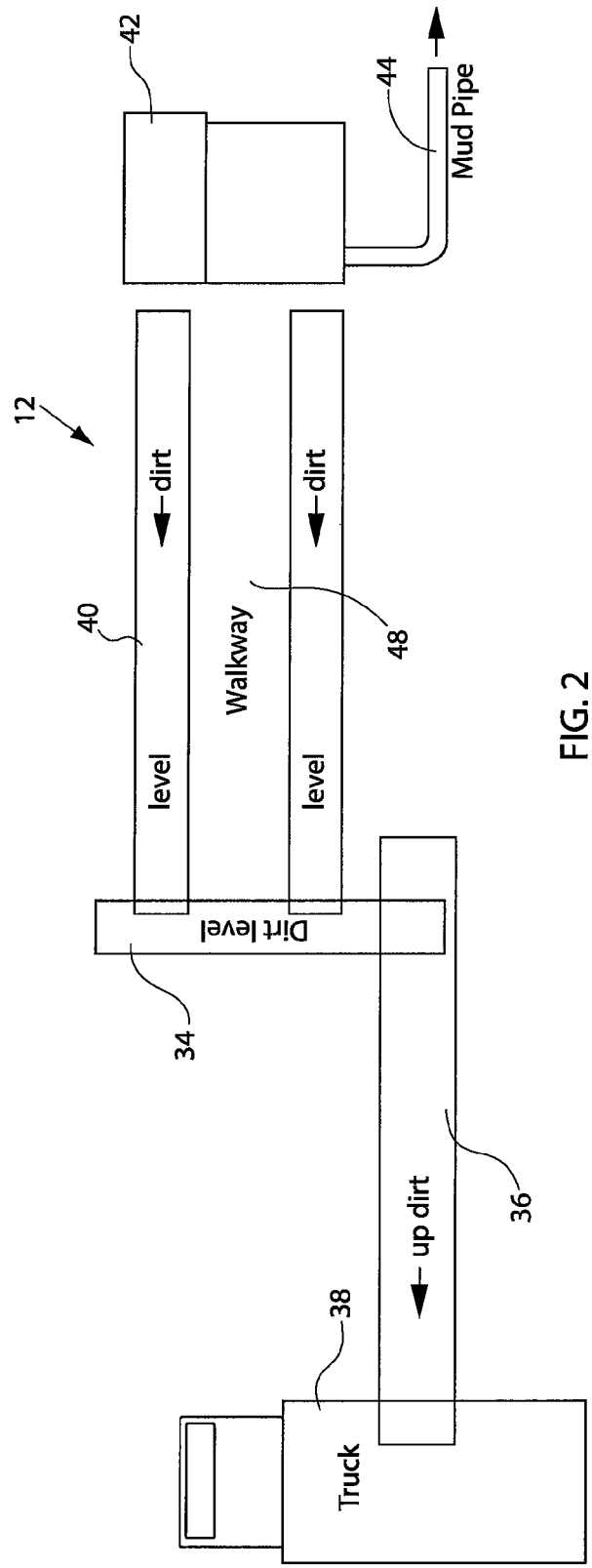
FIG. 2 is a schematic plan view of the conveyor arrangement for removed dirt and soil.

Referring now to FIG. 1 and FIG. 2 together, FIG. 1 shows the conveyor arrangement for rhizomes according to an embodiment of the invention, and FIG. 2 shows a schematic plan view of the conveyor arrangement for removed dirt and soil. In practice, the conveyor arrangement of FIG. 2 is positioned so that dirt, debris, and soil falling from the rhizomes as they are being processed by the apparatus shown in FIG. 1 falls on conveyors shown in FIG. 2 to be taken away, such as for redeploying in a field.

FIG. 1 shows a gross hopper 14 having a live bottom that can receive a load of clusters of rhizomes, such as those dumped by a dump truck. Thus, the hopper 14 is generally wide enough to receive the clusters falling from the bed of a dump truck. In a preferred embodiment, the clusters are obtained by digging in a mature field of *miscanthus* using a digger as disclosed in our co-pending application entitled "Digger for Rhizomes and the like,", Ser. No. 14/170,573, filed on Jan. 31, 2014.

The hopper 14's live bottom raises the clusters and drops them onto a second conveyor 16 with a live bottom. The combination of the hoppers 14 and 16 contribute to reducing the large volume bulk quantity of clusters into a reduced size stream of clusters. The clusters fall from the live bottom conveyor 16 on to a divider 46 positioned below the exit of the conveyor 16. The divider 46 is made of two sloping plates 18, and the clusters of rhizomes hit the respective sloping plates and fall to the right or left onto one of a conveyor 20. That is, the clusters falling on the right side of the divider 46 are deposited onto the right conveyor, and the clusters falling on the left side of the divider 46 are deposited on the left conveyor. As seen in FIG. 1, various stages of conveyors 20, 22, 24, 26 and 28 are provided in duplicate. Each of the conveyors with a live bottom has crossbars can transport clusters of rhizomes along the direction of the arrow shown in FIG. 1, raising the clusters of the incline of the conveyor. The duplication of the conveyors 20, 22, 24, 26 and 28 allows each conveyor to be narrow enough so that all the parts of the conveyor can be accessed by a person walking on a walkway 48 between the conveyors, and yet be able to promptly handle the volume of clusters which may be deposited from a full dump truck. Accessibility of the conveyors to a person is useful in case of jams or other malfunctions that occur that need to be cleared.

The clusters of rhizomes travelling on the conveyors 20 are narrowed into a narrower stream, as will be discussed further, and then deposited on to cutter conveyors 22 that have a live bottom. The clusters on conveyor 22 become caught on upright posts and are forced by the upright posts against downwardly extending obstructers arrayed across the cutter conveyors 22 to cut or break up the cluster into a smaller subcluster. Several stages of this cutting/breaking can take place on the cutter conveyors 22 (and 26).

From the cutter conveyors 22, the reduced size clusters are dropped onto a screen and shaker conveyor 24 which is preferably foraminous, such as made of a screen or mesh, so that dirt and debris which has been loosened can be shaken from the clusters and allowed to fall through the conveyor 24 onto the conveyors 40 shown in FIG. 2. The foraminous screen and shaker conveyor 24 is caused to vibrate by being oscillated with an eccentric wheel underneath the upper run of the endless screen. Other modes of imparting vibration can be used. The rhizomes then fall onto second stages of cutter conveyors 26. These are constructed much like the cutter conveyors 22, except that the upright bars and obstructers are placed closer together, so that the reduced size clusters encountering the obstructers of conveyors 26 can be further reduced in size by encountering more closely spaced obstructers.

From the cutter conveyors 26, the reduced size clusters are dropped into a conveyor within a housing 28 which is equipped with spray nozzles to spray a liquid, such as water, onto the reduced size rhizomes and wash away additional dirt. The water, with the dirt, is drained into a drainage sump 42 and directed away through a pipe 44. See FIG. 2. Once the washed rhizomes are discharged from the conveyors 28, they fall onto a further inclined conveyor 30 for a relatively long run, allowing the residual water to drain off, and to carry the reduced size, cleaned rhizomes to a hopper 32. The rhizomes in hopper 32 can be taken to a planting apparatus to replant the reduced sized, cleaned rhizomes in a field. A preferred planting apparatus is disclosed in my co-pending patent application Ser. No. 14/170,572, filed on Feb. 1, 2014, entitled "Planter for Rhizomes and the like."

Referring now to FIG. 2, as noted above, dirt and debris that has been loosened from the screen shaker 24 and the cutter stages 22 and 26 falls onto conveyors 40, which transport the soil in the direction indicated by the arrow. At the end of the conveyors 40, the dirt falls on to a further conveyor 34, which transports the dirt and debris laterally, in the direction of the arrow to a further conveyor 36 which is inclined and carries the dirt upward to dump it into a reservoir, such as the bed of a dump truck 38. Once the reduced sized rhizomes encounter the water of the washing components 28, the resulting drainage of water and soil is transported through the mud pipe 44.

Figure 3:
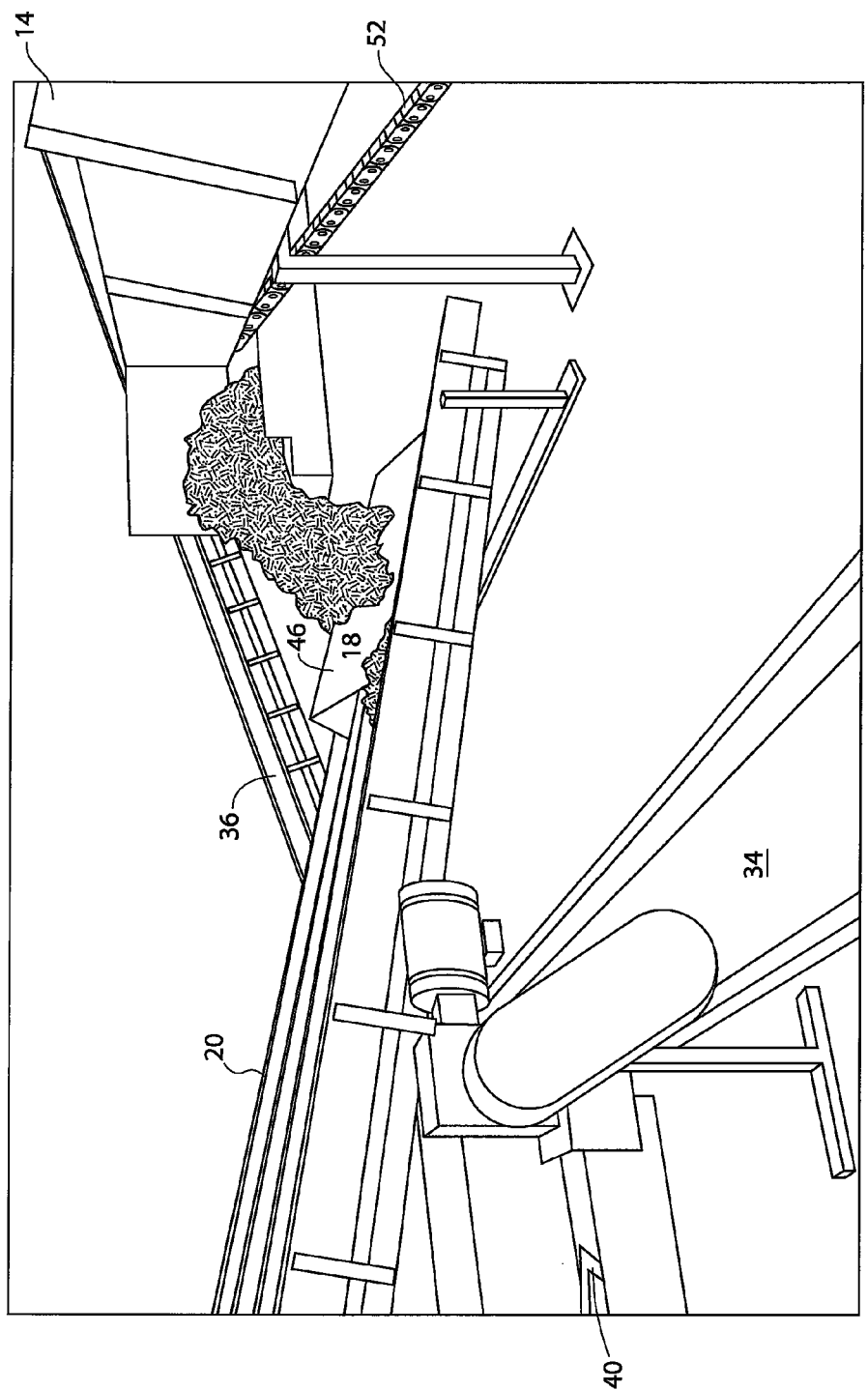
FIG. 3 is a side view of the infeed part of the processing arrangement, showing parts of conveyors for both rhizomes and removed dirt and soil.

FIG. 3 shows a perspective view of the cluster infeed apparatus. The gross hopper 14 is shown having a live bottom, with a chain 52 trained over a sprocket 50, as in common with other live bottom installations. The clusters of rhizomes fall onto the transverse conveyor 16, and from there are dumped onto the divider 46 and its two sloping sides 18. Each sloping side 18 directs its clusters of rhizomes into one of the two narrowing conveyors 20, which is driven in conventional conveyor fashion to transport the clusters upwardly, to the left in the view of FIG. 3. FIG. 3 also shows several of the dirt handling conveyors, including the main dirt conveyor 40 which drops dirt onto the lateral conveyor 34. Also seen in the background is the dirt conveyor 36, which receives dirt dropped off the end of the conveyor 34 and takes it upwardly to a truck or collection bin 38, not seen in FIG. 3.

Figure 4:
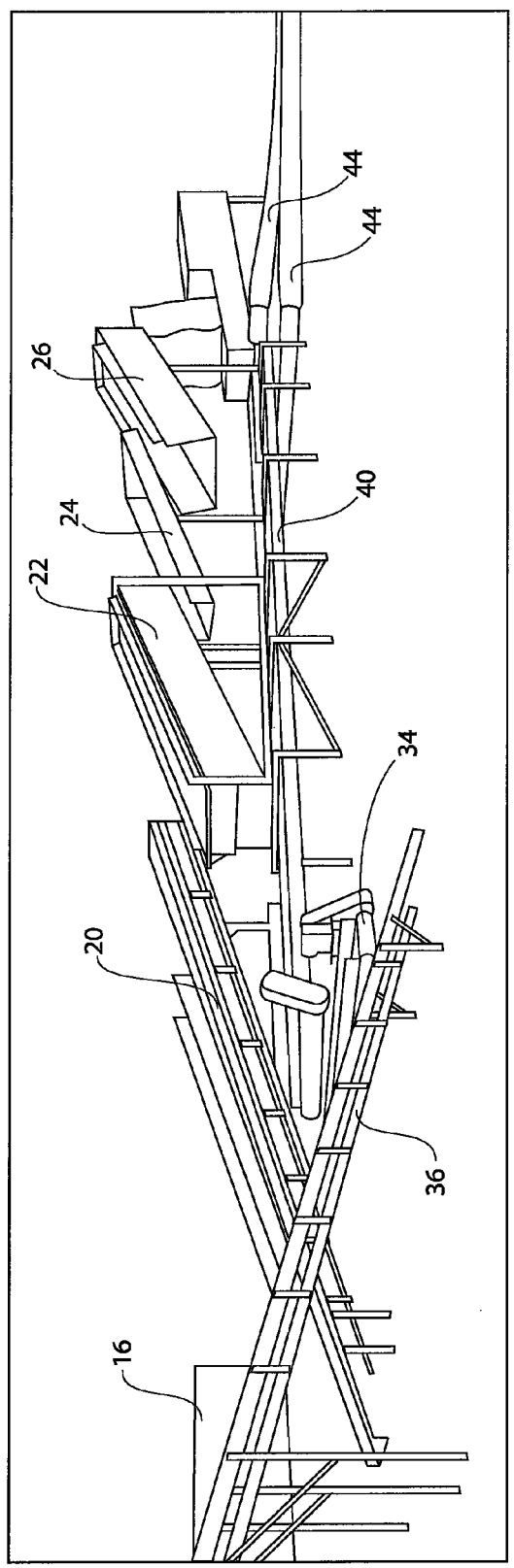
FIG. 4 is a right side view of a substantial part of the processing arrangement, showing conveyors for both rhizomes and removed dirt and soil.

FIG. 4 is a view of a larger area of the apparatus from the right side. The distribution conveyor 16 drops rhizomes onto the narrowing conveyors 20. Those narrowing conveyors raise the clusters and move them to the right, in the view of FIG. 4. At the end of the conveyors 20, the rhizomes drop onto cutter conveyors 22, which again move them to the right and drop them onto the shaker and screener conveyors 24 which again moves them to the right and at the end drops them into the second cutter conveyors 26, which moves them upwardly to the right, and drops them into the washer conveyor 28. FIG. 4 also shows the dirt removal conveyor 40 extending below at least part of all of the conveyors 20, 22, 24 and 26 so that the dirt falling from any of them is transported in the direction to the left shown in FIG. 4. From there, the dirt drops onto the conveyor 34 and is transported laterally away from the equipment and deposited on the outfeed conveyor 36. The mud pipes 44 are shown on in FIG. 4, carrying dirty water away from the wash housing 28.

Figure 5:
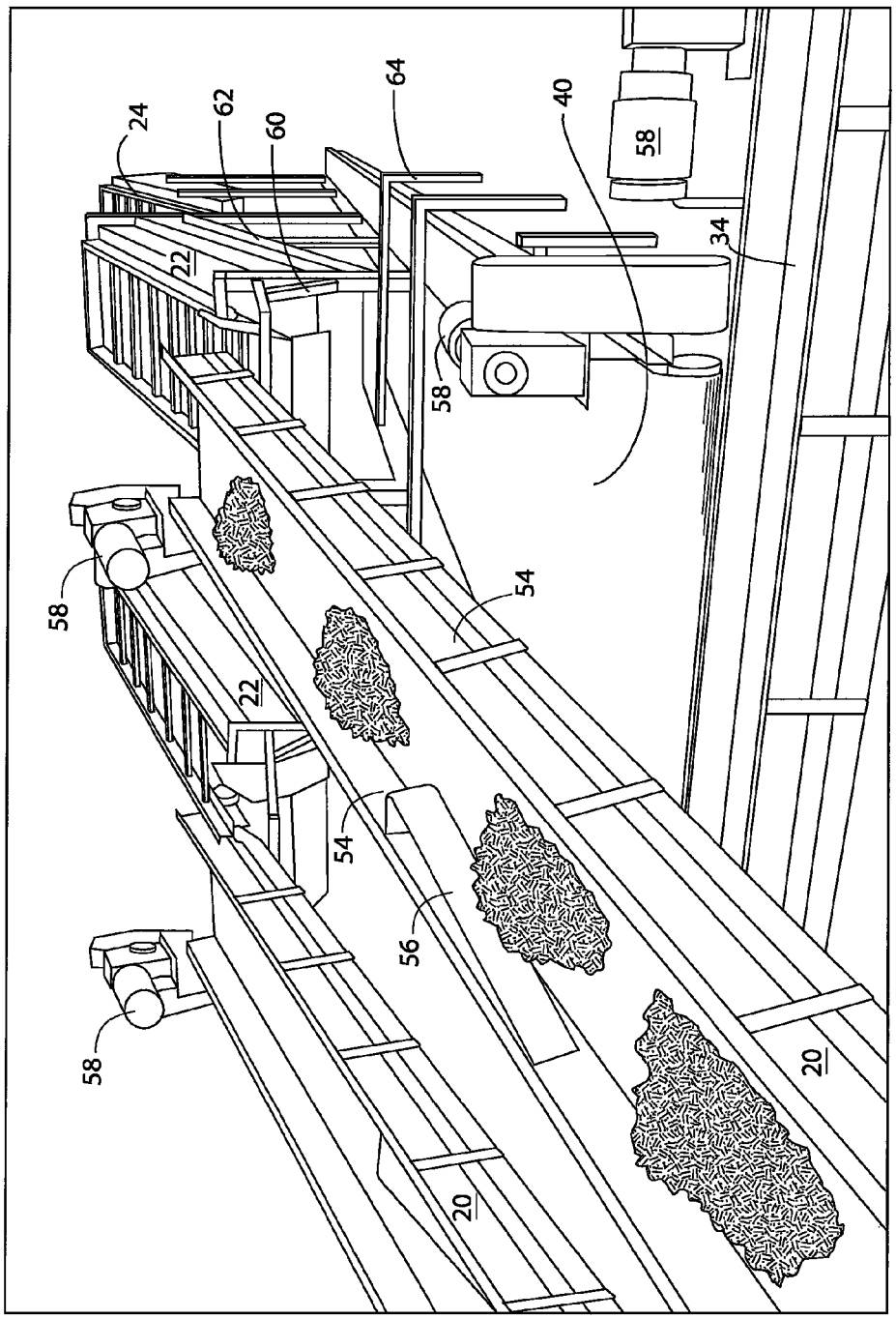
FIG. 5 is a rear side view of the infeed part of the processing arrangement, showing parts of conveyors for both rhizomes and removed dirt and soil.

As seen if FIG. 5, the narrowing conveyor 20 has a pair of opposed sidewalls 54, and a sloping wall insert 56 which the rhizomes may encounter if they are too close to one of the sidewalls. The sloping wall insert 56 guides them toward the center of the conveyor 20. At the top of the conveyor 20, they drop into the cutter conveyors 22. FIG. 5 shows a number of electric motors 58 arrayed to drive each of the conveyors by suitable gearing. Of course, other types of prime movers can be adopted, such as hydraulic motors or the like, which would be apparent to those with ordinary skill in the art.

FIG. 5 also shows that the narrowing conveyor 20 extends over the outfeed and of the dirt conveyor 40, and a superstructure 60 supports the upper end of conveyor 20. The superstructure 60 is in turn supporting by a framework 62 which supports the cutter conveyor 20. The framework 62 is itself supported on a framework 64 spanning over the dirt conveyor 40. Similar structural support for the shaker screener 24 and second cutter conveyor 26 is provided.

Figure 6:
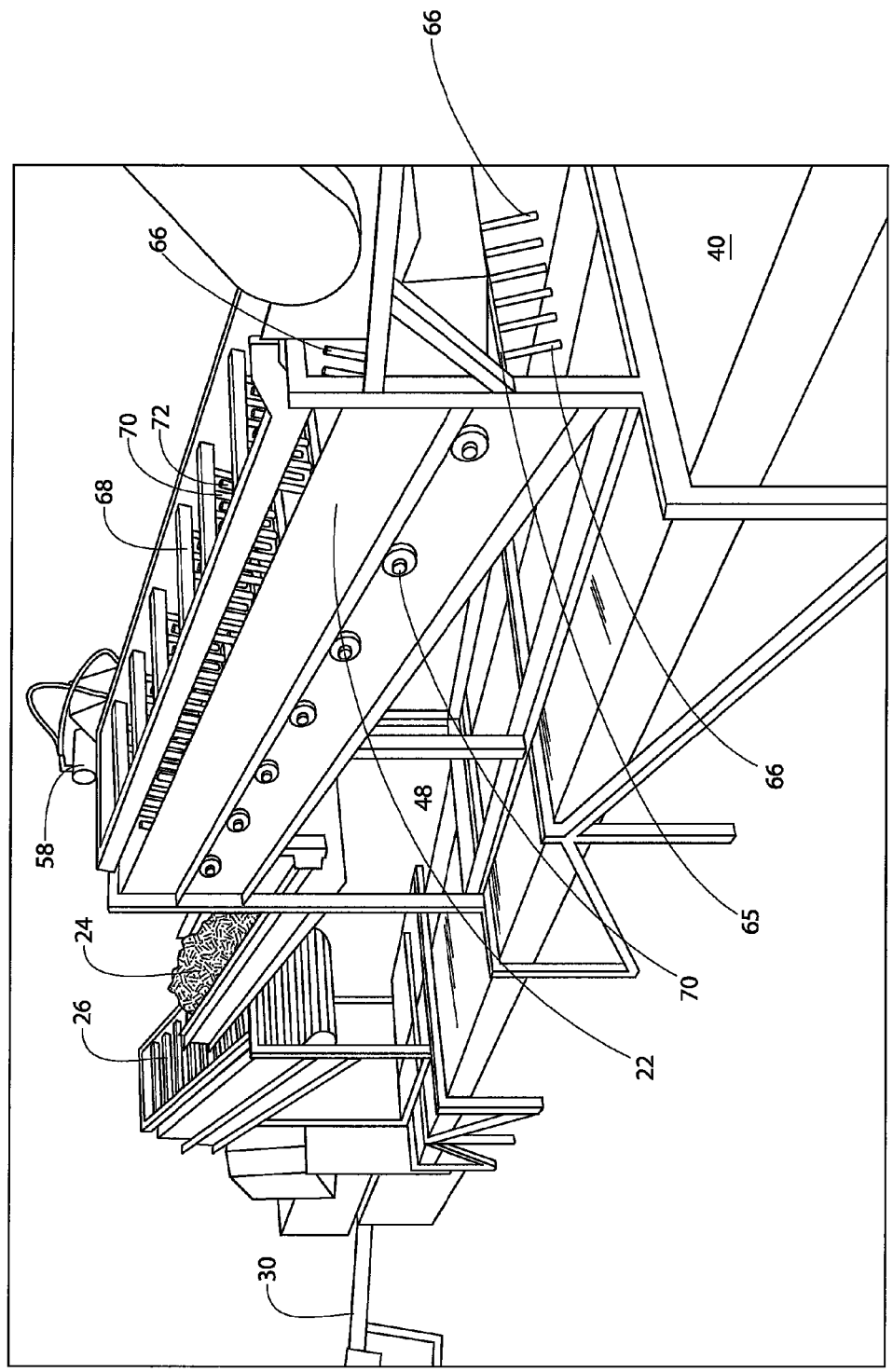
FIG. 6 is a left side view of the part of the processing arrangement, showing parts of conveyors for both rhizomes and removed dirt and soil.

FIG. 6 shows the first cutter conveyor 22. A bearing 70 holds a sprocket on which one of the opposed chains is driven for the live bottom apparatus of the conveyor 22. A similar chain is mounted on the opposite side of the conveyor 22, in conventional live bottom construction, along with cross bars 65 extending between the chains. The cross bars 65 of the live bottom have upright posts 66 mounted on them, so that the upright posts 66 stand relatively parallel with one another and move upwardly, up the cutter conveyor 22 when driven by the motor 58. The clusters of rhizomes falling on the cutter conveyor 22 from the conveyor 20 are caught and pushed by the upright posts 66 upwardly, to the left in FIG. 6. FIG. 6 also shows upper crossbars 68 mounted to the conveyor 22 and their downwardly extending obstructers 70 and 72. As the clusters are pushed by the upright posts 66, they encounter the first series of obstructers 70, which preferably have a leading edge in a blade format, so that the cluster is cut or broken and reduced in size. The reduced size cluster continues to be pushed by the upright posts 66 until they encounter additional obstructers 72, which generally are spaced closer to one another than the obstructers 70, so that further reductions in size of the reduced size clusters can be obtained. The dirt and soil loosened by this process can drop from the conveyor 22 onto the conveyor 40. As seen in FIG. 6, several stages of such reduction in size can take place on the cutter conveyor 22.

Cutter conveyor 22 then discharges the reduced size rhizomes clusters onto the shaker conveyor 24. As mentioned above, the conveyor belt of the conveyor 24 is in the form of a screen having holes over its surface, so that dirt loosened from the clusters of rhizomes on the shaker screener conveyor 24 can fall through the holes onto the conveyor 40 and be removed from the premises, as noted above. The conveyor 24 is provided with a driven eccentric roller 72, so that its eccentricity periodically bumps with the top surface of the foraminous conveyor, and causes shaking and vibration of the reduced sized clusters, further shaking loosened soil from the clusters, where it can fall through the screen onto the conveyor 40.

The conveyor 24 redischarges the reduced size clusters onto a second cutter conveyor 26 which is constructed much like the conveyor 22, with the proviso that the cutting obstructers are closer together than those of the cutter conveyor 22 to provide further reductions in size. Preferably the reductions in size occur continually, until a majority of the clusters are reduced to single rhizomes that are 3 to 6, or more preferably, 4 to 5 inches long.

Figure 7:
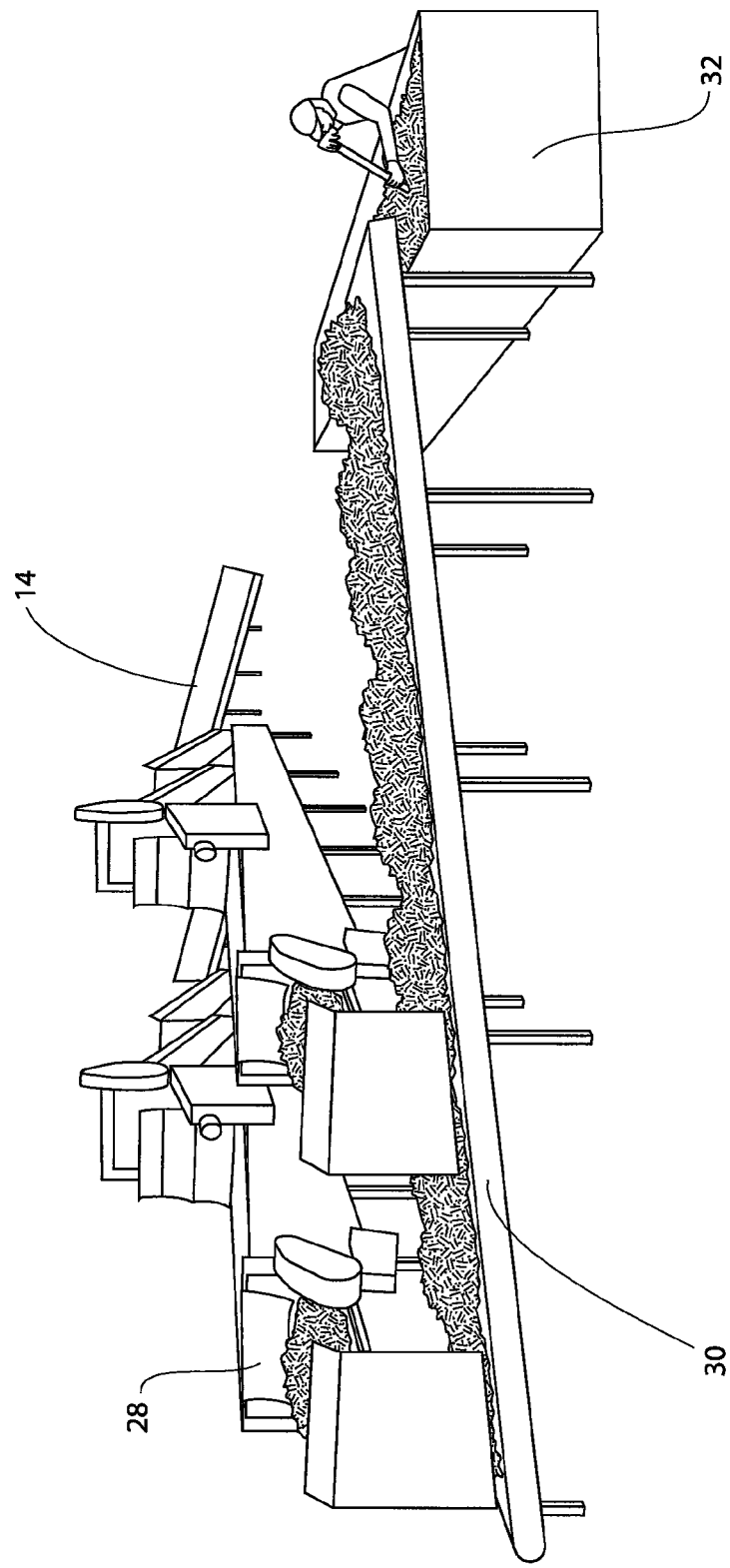
FIG. 7 is an end view on wash/outfeed side of the processing arrangement, showing parts of conveyors for both rhizomes and removed dirt and soil.

The end of the cutter conveyor 26 then drops the reduced size rhizomes into the wash housing 28, in the form of a conveyor which again conveys the rhizomes upwardly, past a plurality of nozzles (not shown) which spray the rhizomes (typically with water) to wash dirt away from them. The bottom of the conveyor 28 drains the resulting muddy water into the mud pipes 44 for discharge. At the end of the conveyor 28, the reduced sized, washed clusters drop onto the outfeed conveyor 30, as seen in FIG. 7. Outfeed conveyor 30 receives rhizomes from both of the two wash lines 28, reconsolidating the two rhizome flows. The outfeed conveyor 30 allows some travel time, during which the excess water can drain from the rhizomes, and the clean and washed rhizomes are dropped from the end of the conveyor 30 into a hopper 32. From there they can be taken to a planter, as noted above, for planting in a field.

Various mechanical substitutes for the specific apparatus described above, can be provided, including various other conveyor structures and arrangements.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An apparatus for processing clusters of rhizomes to condition the clusters of rhizomes for replanting to grow *miscanthus* plants comprising:

a hopper for receiving quantities of clusters of rhizomes, a first inclined ramp conveyor positioned to receive the clusters of rhizomes from the hopper and having a live bottom mounted to move the clusters of rhizomes up the first inclined ramp conveyor, including upright posts that move with the live bottom to catch and push the clusters of rhizomes up the first inclined ramp conveyor, the first inclined ramp conveyor provided with superstructure bars extending above the live bottom and having obstructers extending downward from the superstructure bars toward the live bottom, so the upright posts on the live bottom catch and push clusters of rhizomes and soil up the first inclined ramp conveyor and as the clusters of rhizomes encounter the obstructers, the clusters of rhizomes are reduced in size and soil is loosened from the clusters of rhizomes, a second inclined ramp conveyor positioned to receive reduced-size clusters of rhizomes from the first inclined ramp conveyor and having a vibrator to impart vibration to the reduced-size clusters of rhizomes to shake soil from the reduced-size clusters of rhizomes, a washer conveyor downstream of the second inclined ramp conveyor to receive the reduced-size clusters of rhizomes and having a liquid supply apparatus to apply liquid to the reduced-size clusters of rhizomes to wash soil from the reduced-size clusters of rhizomes, and a collector to receive the washed, reduced-size clusters of rhizomes to supply the reduced-size clusters of rhizomes to a planter.

2. An apparatus as claimed in claim 1 further comprising a soil collector conveyor positioned under at least the second inclined ramp conveyor to collect soil shaken from the reduced-size clusters of rhizomes.

3. An apparatus as claimed in claim 2 wherein the soil collector conveyor is positioned under the first inclined ramp conveyor and a lateral conveyor transports collected soil in a direction transverse to the soil collector conveyor to allow the soil to be returned to a field.

4. An apparatus as claimed in claim 1 wherein a third inclined ramp conveyor is positioned to receive the reduced-size clusters of rhizomes from the second inclined ramp conveyor and having a live bottom mounted to move the clusters of rhizomes up the third inclined ramp conveyor, including upright posts that move with the live bottom to catch and push the reduced-size clusters of rhizomes up the third inclined ramp conveyor, the third inclined ramp conveyor provided with superstructure bars extending above the live bottom and having obstructers extending downward from the superstructure bars toward the live bottom, so the upright posts on the live bottom catch and push the reduced-size clusters of rhizomes up the third inclined ramp conveyor and as the reduced-size clusters of rhizomes encounter the obstructers, the reduced-size clusters of rhizomes are further reduced in size and soil is loosened from the reduced-size clusters of rhizomes.

5. An apparatus as claimed in claim 1 further comprising an outfeed ramp positioned to receive the washed, reduced-size clusters of rhizomes from the washer conveyor to allow liquid to drain from the washed, reduced-size clusters of rhizomes.

6. An apparatus as claimed in claim 1 comprising two first inclined ramp conveyors, two second inclined ramp conveyors, two washer conveyors, with the two first inclined ramp conveyors supplied with the clusters of rhizomes from a common hopper.

7. An apparatus as claimed in claim 6 further comprising two narrowing inclined ramp conveyors that each has a live bottom moving in a first direction and a sidewall above the live bottom that forms an acute angle with the first direction, so that clusters of rhizomes traveling on the live bottom of the narrowing inclined ramp conveyor are guided by the sidewall toward a central portion of the live bottom of the narrowing inclined ramp conveyor and each narrowing inclined ramp conveyor discharges the clusters of rhizomes to one of the first inclined ramp conveyors.

8. An apparatus as claimed in claim 7 wherein a divider in the form of two opposed slopes with a common peak is positioned between the common hopper and the two narrowing inclined ramp conveyors, so that as clusters of rhizomes fall from the common hopper onto the divider, some of the clusters of rhizomes impact one of the two opposed slopes to fall onto one of the narrowing inclined ramp conveyors and others of the clusters of rhizomes fall on the other of the two opposed slopes to fall onto the other narrowing inclined ramp conveyor.

9. An apparatus for processing clusters of rhizomes to condition the clusters of rhizomes for replanting to grow *miscanthus* plants comprising:

a hopper for receiving quantities of clusters of rhizomes, two narrowing inclined ramp conveyors that each has a live bottom moving in a first direction and a sidewall above the live bottom that forms an acute angle with the first direction, so that clusters of rhizomes traveling on the live bottom are guided by the sidewall toward a central portion of the live bottom;

a divider in the form of two opposed slopes with a common peak that is positioned between the common hopper and the two narrowing inclined ramp conveyors, so that as the clusters of rhizomes fall from the common hopper onto the divider, some of the clusters of rhizomes impact one of the two opposed slopes to fall onto one of the narrowing inclined ramp conveyors and others of the clusters of rhizomes fall on the other of the two opposed slopes to fall onto the other narrowing inclined ramp conveyor, each narrowing inclined ramp conveyor discharging the clusters of rhizomes to one of two second inclined ramp conveyors and each second inclined ramp conveyor having a live bottom mounted to move the clusters of rhizomes up the respective second inclined ramp conveyor, including upright posts that move with the live bottom to catch and push the clusters of rhizomes up the second inclined ramp conveyor, the second inclined ramp conveyor provided with superstructure bars extending above the live bottom and having obstructers extending downward from the superstructure bars toward the live bottom, so the upright posts on the live bottom catch and push the clusters of rhizomes and soil up the second inclined ramp conveyor and as the clusters of rhizomes encounter the obstructers, the clusters of rhizomes are broken to reduce the size of the clusters of rhizomes and to loosen and separate soil from the reduced-size clusters of rhizomes, two third inclined ramp conveyors, each positioned to receive the reduced-size clusters of rhizomes from one of the second inclined ramp conveyors and having a vibrator to impart vibration to the reduced-size clusters of rhizomes to shake soil from the reduced-size clusters of rhizomes;

two fourth inclined ramp conveyors positioned to receive the reduced-size clusters of rhizomes from one of the third inclined ramp conveyors and having a live bottom mounted to move the reduced-size clusters of rhizomes up the fourth inclined ramp conveyor, including upright posts that move with the live bottom to catch and push the reduced-size clusters of rhizomes up the fourth inclined ramp conveyor, the fourth inclined ramp conveyors each provided with superstructure bars extending above the live bottom and having obstructers extending downward from the superstructure bars toward the live bottom, so the upright posts on the live bottom catch and push the reduced-size clusters of rhizomes and soil up the fourth inclined ramp conveyor and as the reduced-size clusters of rhizomes encounter the obstructers, the reduced-size clusters of rhizomes are broken further to reduce the size of the reduced-sized clusters of rhizomes and to loosen soil from the reduced-sized clusters of rhizomes;

two washer conveyors, each positioned downstream of one of the fourth inclined ramp conveyors to receive the reduced-size clusters of rhizomes and having a liquid supply apparatus to apply liquid to the reduced-size clusters of rhizomes to wash soil from the reduced-size clusters of rhizomes, an outfeed ramp positioned to receive the washed, reduced-size clusters of rhizomes from the washer conveyors to allow liquid to drain from the washed, reduced-size clusters of rhizomes for supply to a planter, and a soil collector conveyor positioned under at least the third inclined ramp conveyor and the fourth inclined ramp conveyor to collect soil shaken from the reduced-size clusters of rhizomes, and a lateral conveyor positioned to transport collected soil in a direction transverse to the soil collector conveyor, making the soil available to be returned to the field.

* * * * *

UNITED STATES PATENT AND TRADEMARK OFFICE
CERTIFICATE OF CORRECTION

| | | |
|---|---|---|
| PATENT NO. | : 9,491,899 B1 | Page 1 of 1 |
| APPLICATION NO. | : 14/170578 | |
| DATED | : November 15, 2016 | |
| INVENTOR(S) | : Fulghum et al. | |

It is certified that error appears in the above-identified patent and that said Letters Patent is hereby corrected as shown below:

In the Specification

In Column 6, Line 60, Jan.31, 2014 should be "Feb 1, 2014"

In Column 7, Line 8 after the word crossbars, the word --that-- should be inserted In Column 8, Line 62 and 63, both occurrences of cross bars should be "crossbars"

Signed and Sealed this
Eighteenth Day of April, 2017

Michelle K. Lee
*Director of the United States Patent and Trademark Office*